(12) United States Patent
Li et al.

(10) Patent No.: US 9,828,502 B2
(45) Date of Patent: *Nov. 28, 2017

(54) SINGLE PELLET POLYMERIC COMPOSITIONS

(71) Applicant: FINA TECHNOLOGY, INC., Houston, TX (US)

(72) Inventors: Fengkui Li, Houston, TX (US); John Ashbaugh, Houston, TX (US); David Rauscher, Longview, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/815,309

(22) Filed: Jul. 31, 2015

(65) Prior Publication Data

US 2015/0337130 A1  Nov. 26, 2015

Related U.S. Application Data

(60) Continuation of application No. 13/894,986, filed on May 15, 2013, now Pat. No. 9,139,728, which is a continuation-in-part of application No. 13/795,270, filed on Mar. 12, 2013, now Pat. No. 8,546,490, which is a continuation of application No. 13/562,122, filed on Jul. 30, 2012, now Pat. No. 8,444,905, which is a division of application No. 12/165,037, filed on Jun. 30, 2008, now Pat. No. 8,268,913.

(51) Int. Cl.

| C08L 67/00 | (2006.01) |
|---|---|
| C08L 23/14 | (2006.01) |
| C08L 23/26 | (2006.01) |
| B29C 45/00 | (2006.01) |
| C08J 5/18 | (2006.01) |
| C08L 9/00 | (2006.01) |
| C08L 23/08 | (2006.01) |
| C08L 23/10 | (2006.01) |
| C08L 23/12 | (2006.01) |
| C08L 23/16 | (2006.01) |
| C08L 67/04 | (2006.01) |
| B29K 105/00 | (2006.01) |
| C08L 51/06 | (2006.01) |

(52) U.S. Cl.
CPC .......... *C08L 67/00* (2013.01); *B29C 45/0001* (2013.01); *C08J 5/18* (2013.01); *C08L 9/00* (2013.01); *C08L 23/08* (2013.01); *C08L 23/10* (2013.01); *C08L 23/12* (2013.01); *C08L 23/14* (2013.01); *C08L 23/16* (2013.01); *C08L 23/26* (2013.01); *C08L 67/04* (2013.01); *B29K 2105/0088* (2013.01); *B29K 2623/10* (2013.01); *B29K 2667/046* (2013.01); *C08J 2323/10* (2013.01); *C08J 2467/04* (2013.01); *C08L 51/06* (2013.01); *C08L 2205/02* (2013.01); *C08L 2205/03* (2013.01); *C08L 2205/035* (2013.01)

(58) Field of Classification Search
CPC .......... C08L 67/00; C08L 67/04; C08L 23/14; C08L 23/26; C08L 23/10; C08L 23/08; C08L 23/16; C08L 23/12; C08L 9/00; C08L 2205/02; C08L 2205/03; C08L 2205/035; C08L 51/06; C08J 5/18; C08J 2323/10; C08J 2467/04; B29C 45/0001; B29K 2623/10; B29K 2667/046; B29K 2105/0088

See application file for complete search history.

(56) References Cited

U.S. PATENT DOCUMENTS

| 4,578,431 | A | * | 3/1986 | Shaw | C08F 8/00 525/333.8 |
|---|---|---|---|---|---|
| 6,028,143 | A | | 2/2000 | Mukai | |
| 6,476,117 | B1 | * | 11/2002 | Wang | C08F 8/00 524/504 |
| 6,503,990 | B2 | * | 1/2003 | Kasehagen | C08F 8/50 525/333.8 |
| 8,604,123 | B1 | * | 12/2013 | Weismann | C08L 67/04 428/220 |
| 2005/0140044 | A1 | * | 6/2005 | Jackson | B01J 2/20 264/142 |
| 2009/0264591 | A1 | | 10/2009 | Sano et al. | |
| 2009/0326152 | A1 | * | 12/2009 | Li | C08L 23/10 525/190 |
| 2011/0190447 | A1 | * | 8/2011 | Li | B29C 45/72 525/64 |
| 2012/0035323 | A1 | * | 2/2012 | Donnelly | C08L 23/10 525/64 |
| 2012/0208037 | A1 | * | 8/2012 | Li | B32B 7/12 428/483 |
| 2012/0296044 | A1 | * | 11/2012 | Li | C08J 5/18 525/190 |
| 2016/0312003 | A1 | * | 10/2016 | Vanheule | C08K 5/11 |

FOREIGN PATENT DOCUMENTS

| CN | 101918211 A | 12/2010 |
|---|---|---|
| CN | 102119178 A | 7/2011 |
| WO | WO2010/120763 | * 10/2010 |

OTHER PUBLICATIONS

Lim, L.T., et al.; Progress in Polymer Science, 2008, p. 820-852.*
Liu, N.C., et al.; Advances in Polymer Technology, 1992, p. 249-262.*
Henton, D.E., et al.; Polylactic Acid Technology, 2000, p. 527-578.*
Zhai, W., et al.; International Journal of Molecular Sciences, 2009, p. 5381-5397.*
Luperox® Dialkyl Peroxides, 2007, p. 1-9.*
Office Action issued in Chinese Application No. 2014800401452, dated Sep. 20, 2016, 16 pages.

\* cited by examiner

*Primary Examiner* — Robert Jones, Jr.
(74) *Attorney, Agent, or Firm* — Albert Shung

(57) ABSTRACT

A pellet composed of a polymeric blend having a polyolefin and polylactic acid.

5 Claims, 5 Drawing Sheets

SINGLE PELLET POLYMERIC COMPOSITIONS

CROSS-REFERENCE TO RELATED APPLICATIONS

The subject matter of the present application is a Continuation of U.S. patent application Ser. No. 13/894,986, filed on May 15, 2013, which is a Continuation in Part of U.S. application Ser. No. 13/795,270, filed Mar. 12, 2013, now issued as U.S. Pat. No. 8,546,490, which is a Continuation of U.S. application Ser. No. 13/562,122, filed on Jul. 30, 2012, now issued as U.S. Pat. No. 8,444,905, which is a Divisional of U.S. application Ser. No. 12/165,037, filed Jun. 30, 2008, now issued as U.S. Pat. No. 8,268,913, the entireties of which are incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Technical Field

This disclosure relates to polymeric compositions. More specifically, this disclosure relates to single pellet polymeric compositions.

Background

Synthetic polymeric materials, such as polypropylene and polyethylene resins, are widely used in the manufacturing of a variety of end-use articles ranging from medical devices to food containers. While articles constructed from synthetic polymeric materials have widespread utility, one drawback to their use is that these materials tend to remain semipermanently in a natural environment. In response to environmental concerns, interest in the production and utility of more readily biodegradable polymeric materials has been increasing. These materials, also known as "green materials," may undergo accelerated degradation in a natural environment.

SUMMARY

The disclosure includes a pellet composed of a polymeric blend having a composition of between 99.5-51 wt % polyolefin and 0.5-49.9 wt % polylactic acid.

The disclosure also includes a pellet, wherein the pellet includes a polymeric blend that includes a polyolefin, a semi-crystalline or amorphous polylactic acid, and a component, wherein the third component is an epoxy-functionalized polyethylene, an epoxy-functionalized polypropylene, SEBS, ethylene methacrylate copolymer, an ethylene-vinyl acetate copolymer, or combinations thereof.

The disclosure further includes a pellet that includes a blend, wherein the blend is composed of a Ziegler-Natta or metallocene-catalyzed polypropylene homopolymer, a random propylene copolymer, an impact copolymer or high density polyethylene. The blend is further composed of a semi-crystalline polylactic acid or amorphous PLA and a maleated polyolefin.

BRIEF DESCRIPTION OF THE DRAWINGS

The present disclosure is best understood from the following detailed description when read with the accompanying figures. It is emphasized that, in accordance with the standard practice in the industry, various features are not drawn to scale

DETAILED DESCRIPTION

Figure 1:
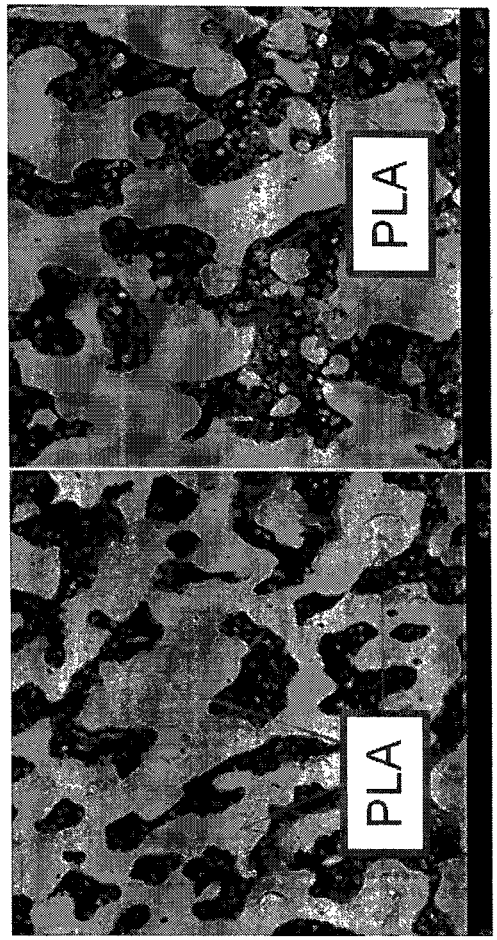
FIG. 1 presents atomic force microscopy pictures of a blend of LX3 12-04/20% Tafmer/10% PLA.

The following disclosure provides many different embodiments, or examples, for implementing different features of various embodiments. Specific examples of components and arrangements are described below to simplify the present disclosure. These are, of course, merely examples and are not intended to be limiting.

Various terms as used herein are shown below. To the extent a term used in a claim is not defined below, it should be given the broadest definition skilled persons in the pertinent art have given that term as reflected in printed publications and issued patents at the time of filing. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations.

Disclosed herein are single pellets blends of at least one polyolefin and polylatic acid. "Single pellet" means that two or more pellets of resin include all components of the blend and are substantially homogenous, i.e., the two or more pellets include a composition that is substantially identical. In certain embodiments, the composition of the single pellet is between 99.5-51 wt % polyolefin and 0.5-49.9 wt % polylactic acid. In some embodiments of the present disclosure, the single pellet may further include a third component, which in certain non-limiting embodiments, may be a modifier or compatibilitzer. The single pellets may be used directly, i.e., without combination with other polymers or modifiers, for processes including, but not limited to, film/sheet extrusion, oriented film, blown film, injection molding, injection stretch blow molding, extrusion molding, extrusion thermoforming, foaming, fiber and tape applications.

The polyolefin in the single pellet may be polypropylene. In an alternative embodiment, the polyolefin may be polyethylene.

In an embodiment, the polyolefin is polypropylene. The polypropylene may be a homopolymer provided however that the homopolymer may contain up to 5% of another alpha-olefin, including but not limited to $C_2$-$C_8$ alpha-olefins such as ethylene and 1-butene. Despite the potential presence of small amounts of other alpha-olefins, the polypropylene is generally referred to as a polypropylene homopolymer.

Polypropylene homopolymers suitable for use in this disclosure may include any type of polypropylene known in the art with the aid of this disclosure. For example, the polypropylene homopolymer may be atactic polypropylene, isotactic polypropylene, hemi-isotactic, syndiotactic polypropylene, or combinations thereof. A polymer is "atactic" when its pendant groups are arranged in a random fashion on both sides of the chain of the polymer. In contrast, a polymer is "isotactic" when all of its pendant groups are arranged on the same side of the chain and "syndiotactic" when its pendant groups alternate on opposite sides of the chain. In hemi-isotactic polymer, every other repeat unit has a random substituent.

In an embodiment, a polypropylene homopolymer suitable for use in this disclosure may have a density of from 0.895 g/cc to 0.920 g/cc, alternatively from 0.900 g/cc to 0.915 g/cc, and alternatively from 0.905 g/cc to 0.915 g/cc as determined in accordance with ASTM D1505; a melting temperature of from 150° C. to 170° C., alternatively from 155° C. to 168° C., and alternatively from 160° C. to 165° C. as determined by differential scanning calorimetry; a melt flow rate of from 0.5 g/10 min. to 50 g/10 min., alternatively from 1.0 g/10 min. to 10 g/10 min., and alternatively from 1.5 g/10 min. to 5.0 g/10 min. as determined in accordance with ASTM D1238 condition "L"; a tensile modulus of from 200,000 psi to 350,000 psi; alternatively from 220,000 psi to 320,000 psi, and alternatively from 250,000 psi to 320,000 psi as determined in accordance with ASTM D638; a tensile stress at yield of from 3,000 psi to 6,000 psi, alternatively from 3,500 psi to 5,500 psi, and alternatively from 4,000 psi to 5,500 psi as determined in accordance with ASTM D638; a tensile strain at yield of from 5% to 30%, alternatively from 5% to 20%, and alternatively from 5% to 15% as determined in accordance with ASTM D638; a flexural modulus of from 120,000 psi to 330,000 psi, alternatively from 190,000 psi to 310,000 psi, and alternatively of from 220,000 psi to 300,000 psi as determined in accordance with ASTM D790; a Gardner impact of from 3 in-lb to 50 in-lb, alternatively from 5 in-lb to 30 in-lb, and alternatively from 9 in-lb to 25 in-lb as determined in accordance with ASTM D2463; a Notched Izod Impact Strength of from 0.2 ft lb/in to 20 ft lb/in, alternatively from 0.5 ft lb/in to 15 ft lb/in, and alternatively from 0.5 ft lb/in to 10 ft lb/in as determined in accordance with ASTM D256A; a hardness shore D of from 30 to 90, alternatively from 50 to 85, and alternatively from 60 to 80 as determined in accordance with ASTM D2240; and a heat distortion temperature of from 50° C. to 125° C., alternatively from 80° C. to 115° C., and alternatively from 90° C. to 110° C. as determined in accordance with ASTM D648.

Examples of polypropylene homopolymers suitable for use in this disclosure include without limitation 3371, 3271, 3270, and 3276, which are polypropylene homopolymers commercially available from Total Petrochemicals USA, Inc. In an embodiment, the polypropylene homopolymer (e.g., 3371) has generally the physical properties set forth in Table 1.

TABLE 1

| Properties | 3371 Typical Value | Test Method |
|---|---|---|
| Physical | | |
| Density, g/cc | 0.905 | ASTM D1505 |
| Melt Flow Rate (MFR), g/10 min. | 2.8 | ASTM D1238 condition "L" |
| Mechanical | | |
| Tensile Modulus, psi | 235,000 | ASTM D638 |
| Tensile Stress at Yield, psi | 5,100 | ASTM D638 |
| Tensile Strain at Yield, % | 7.5 | ASTM D638 |
| Flexural Modulus, psi | 202,000 | ASTM D790 |
| Impact | | |
| Gardner impact, in-lb | 149.2 | ASTM D2463 |
| Notched Izod Impact Strength, ft lb/in | 0.69 | ASTM D256A |
| Hardness | | |
| Hardness Shore D | 75 | ASTM D2240 |
| Thermal | | |
| Heat distortion temperature, ° F. | 207 | ASTM D648 |
| Melting Temperature (DSC), ° F. | 325 | DSC |

In another embodiment, the polypropylene may be a high crystallinity polypropylene homopolymer (HCPP). The HCPP may contain primarily isotactic polypropylene. The isotacticity in polymers may be measured via $^{13}C$ NMR spectroscopy using meso pentads and can be expressed as percentage of meso pentads (% mmmm). As used herein, the term "meso pentads" refers to successive methyl groups located on the same side of the polymer chain. In an embodiment, the HCPP has a meso pentads percentage of greater than 97%, or greater than 98%, or greater than 99%. The HCPP may comprise some amount of atactic or amorphous polymer. The atactic portion of the polymer is soluble in xylene, and is thus termed the xylene soluble fraction (XS %). In determining XS %, the polymer is dissolved in boiling xylene and then the solution cooled to 0° C. that results in the precipitation of the isotactic or crystalline portion of the polymer. The XS % is that portion of the original amount that remained soluble in the cold xylene. Consequently, the XS % in the polymer is indicative of the extent of crystalline polymer formed. The total amount of polymer (100%) is the sum of the xylene soluble fraction and the xylene insoluble fraction, as determined in accordance with ASTM D5492-98. In an embodiment, the HCPP has a xylene soluble fraction of less than 1.5%, or less than 1.0%, or less than 0.5%.

In an embodiment, an HCPP suitable for use in this disclosure may have a density of from 0.895 g/cc to 0.920 g/cc, alternatively from 0.900 g/cc to 0.915 g/cc, and alternatively from 0.905 g/cc to 0.915 g/cc as determined in accordance with ASTM D1505; a melt flow rate of from 0.5 g/10 min. to 500 g/10 min., alternatively from 1.0 g/10 min. to 100 g/10 min., and alternatively from 1.5 g/10 min. to 20 g/10 min. as determined in accordance with ASTM D1238; a secant modulus in the machine direction (MD) of from 350,000 psi to 420,000 psi; alternatively from 380,000 psi to 420,000 psi, and alternatively from 400,000 psi to 420,000 psi as determined in accordance with ASTM D882; a secant modulus in the transverse direction (TD) of from 400,000 psi to 700,000 psi, alternatively from 500,000 psi to 700,000 psi, and alternatively from 600,000 psi to 700,000 psi as determined in accordance with ASTM D882; a tensile strength at break in the MD of from 19,000 psi to 28,000 psi, alternatively from 22,000 psi to 28,000 psi, and alternatively from 25,000 psi to 28,000 psi as determined in accordance with ASTM D882; a tensile strength at break in the TD of from 20,000 psi to 40,000 psi, alternatively from 30,000 psi to 40,000 psi, and alternatively of from 35,000 psi to 40,000 psi as determined in accordance with ASTM D882; an elongation at break in the MD from 50% to 200%, alternatively from 100% to 180%, and alternatively from 120% to 150% as determined in accordance with ASTM D882; an elongation at break in the TD of from 50% to 150%, alternatively from 60% to 100%, and alternatively from 80% to 100% as determined in accordance with ASTM D882; a melting temperature of from 150° C. to 170° C., alternatively from 155° C. to 170° C., and alternatively from 160° C. to 170° C. as determined by differential scanning calorimetry; a gloss at 45° of from 70 to 95, alternatively from 75 to 90, and alternatively from 80 to 90 as determined in accordance with ASTM D2457; a percentage haze of from 0.5% to 2.0%, alternatively from 0.5% to 1.5%, and alternatively from 0.5% to 1.0% as determined in accordance with ASTM D1003; and a water vapor transmission rate of from 0.15 to 0.30 g-mil/100 in$^2$/day, alternatively from 0.15 to 0.25 g-mil/100 in$^2$/day, and alternatively from 0.20 to 0.21 g-mil/100 in$^2$/day as determined in accordance with ASTM F-1249-90.

An example of an HCPP suitable for use in this disclosure includes without limitation 3270, which is an HCPP commercially available from Total Petrochemicals USA, Inc. The HCPP (e.g., 3270) may generally have the physical properties set forth in Table 2.

wherein a polypropylene homopolymer phase or component is joined to a copolymer phase or component. The PPHC may comprise from greater than 6.5 wt. % to less than 20 wt. % ethylene by total weight of the PPHC, alternatively from 8.5 wt. % to less than 18 wt. %, alternatively from 9.5 wt. % to less than 16%.

The copolymer phase of a PPHC may be a random copolymer of propylene and ethylene, also referred to as an ethylene/propylene rubber (EPR). PP heterophasic copolymers show distinct homopolymer phases that are interrupted by short sequences or blocks having a random arrangement of ethylene and propylene. In comparison to random copolymers, the block segments comprising the EPR may have certain polymeric characteristics (e.g., intrinsic viscosity) that differ from that of the copolymer as a whole. Without wishing to be limited by theory, the EPR portion of the PPHC has rubbery characteristics which, when incorporated within the matrix of the homopolymer component, may function to provide increased impact strength to the PPHC. In an embodiment, the EPR portion of the PPHC comprises greater than 14 wt. % of the PPHC, alternatively greater than 18 wt. % of the PPHC, alternatively from 14 wt. % to 18 wt. % of the PPHC.

The amount of ethylene present in the EPR portion of the PPHC may be from 38 wt. % to 50 wt. %, alternatively from 40 wt. % to 45 wt. % based on the total weight of the EPR portion. The amount of ethylene present in the EPR portion of the PPHC may be determined spectrophotometrically using a fourier transform infrared spectroscopy (FTIR)

TABLE 2

| Properties | 3270 Typical Value | Test Method |
| --- | --- | --- |
| Physical | | |
| Density, g/cc | 0.910 | ASTM D1505 |
| Melt Mass-Flow Rate (MFR) (230° C./2.16 kg), g/10 min. | 2.0 | ASTM D1238 |
| BOPP Mechanical | | |
| Secant Modulus MD, psi | 420,000 | ASTM 882 |
| Secant Modulus TD, psi | 700,000 | ASTM 882 |
| Tensile Strength at Break MD, psi | 28,000 | ASTM 882 |
| Tensile Strength at Break TD, psi | 39,000 | ASTM 882 |
| Elongation at Break MD, % | 150 | ASTM 882 |
| Elongation at Break TD, % | 60 | ASTM 882 |
| Thermal | | |
| Melting Temperature, ° F. | 329 | DSC |
| Optical | | |
| Gloss (45°) | 85 | ASTM D2457 |
| Haze, % | 1.0 | ASTM D1003 |
| Barrier | | |
| Water Vapor Transmission, 100° F., 90% R.H, g-mil/100 in$^2$/day | 0.2 | ASTM F1249-90 |

In another embodiment, the polypropylene may be a polypropylene copolymer. In certain embodiments, the polypropylene copolymer may be a propylene random copolymer, including, for example, LX 02-15, a metallocene-manufactured polypropylene commercially available from Total Petrochemicals USA, Inc. Other examples of polypropylene copolymers include propylene random copolymers made from Zieger-Natta catalysts, such as the 6000-, 7000-, and 8000-series commercially available from Total Petrochemicals USA, Inc.

In other embodiments, the polypropylene copolymer may be a polypropylene heterophasic copolymer (PPHC)

method. Specifically, the FTIR spectrum of a polymeric sample is recorded for a series of samples having a known EPR ethylene content. The ratio of transmittance at 720 cm$^{-1}$/900 cm$^{-1}$ is calculated for each ethylene concentration and a calibration curve may then be constructed. Linear regression analysis on the calibration curve can then be carried out to derive an equation that is then used to determine the EPR ethylene content for a sample material.

The EPR portion of the PPHC may exhibit an intrinsic viscosity different from that of the propylene homopolymer component. Herein intrinsic viscosity refers to the capability of a polymer in solution to increase the viscosity of said solution. Viscosity is defined herein as the resistance to flow due to internal friction. In an embodiment, the intrinsic viscosity of the EPR portion of the PPHC may be greater than 1 dl/g, alternatively from 2.0 dl/g to 3.0 dl/g, alternatively from 2.4 dl/g to 3.0 dl/g, alternatively from 2.4 dl/g to 2.7 dl/g, alternatively from 2.6 dl/g to 2.8 dl/g. The intrinsic viscosity of the EPR portion of the PPHC is determined in accordance with ASTM D5225.

In an embodiment, the PPHC may have a melt flow rate (MFR) of from 0.5 g/10 min. to 500 g/10 min., alternatively from 1 g/10 min. to 100 g/10 min., alternatively from 1.5 g/10 min. to 50 g/10 min., alternatively from 2.0 g/10 min. to 20 g/10 min. Excellent flow properties as indicated by a high MFR allow for high throughput manufacturing of molded polymeric components. In an embodiment, the PPHC is a reactor grade resin without modification, which may also be termed a low order PP. In some embodiments, the PPHC is a controlled rheology grade resin, wherein the melt flow rate has been adjusted by various techniques such as visbreaking. For example, MFR may be increased by visbreaking as described in U.S. Pat. No. 6,503,990, which is incorporated by reference in its entirety. As described in that publication, quantities of peroxide are mixed with polymer resin in flake, powder, or pellet form to increase the MFR of the resin. MFR as defined herein refers to the quantity of a melted polymer resin that will flow through an orifice at a specified temperature and under a specified load. The MFR may be determined using a dead-weight piston Plastometer that extrudes polypropylene through an orifice of specified dimensions at a temperature of 230° C. and a load of 2.16 kg in accordance with ASTM D1238.

Representative examples of suitable PPHCs include without limitation 4920W and 4920WZ, which are impact copolymer resins commercially available from Total Petrochemicals USA Inc. In an embodiment, the PPHC (e.g., 4920W) has generally the physical properties set forth in Table 3.

TABLE 3

| Properties | Typical Value | ASTM Method |
|---|---|---|
| Physical (resin) | | |
| Melt Flow, g/10 min. | 100 | D1238 |
| Density, g/cc | 0.905 | D1505 |
| Melting Point, ° C. | 160-165 | DSC |
| Mechanical | | |
| Tensile strength at Yield, psi (MPa) | 3700 (25) | D638 |
| Elongation at Yield, % | 6 | D638 |
| Flexural Modulus, psi (MPa) | 190,000 (1,300) | D790 |
| Notched, ft · lb./in. (J/m) | 1.0 (50) | ASTM D256A |
| Thermal | | |
| Heat Deflection, ° C. | 90 | D648 |

In another embodiment, the polypropylene is a high melt strength polypropylene. A high melt strength polypropylene may be a semi-crystalline polypropylene or polypropylene copolymer matrix containing a heterophasic copolymer. The heterophasic copolymer may include ethylene and higher alpha-olefin polymer such as amorphous ethylene-propylene copolymer, for example.

In certain embodiments of the present disclosure, the high melt strength polypropylene may be formed when a multifunctional monomer and a radical initiator are used to form long chain branched and crosslinked polyolefin compositions In one or more embodiments, the multifunctional monomers generally include difunctional monomers, trifunctional monomers and combinations thereof, for example. Suitable multifunctional monomers include acrylic monomers. The acrylic monomers may include 2-(2-ethoxyethoxy) ethyl acrylate, diethylene glycol diacrylate, tridecyl acrylate, tridecylacrylate hexanediol diacrylate, lauryl acrylate, alkoxylated lauryl acrylate, caprolactone acrylate, 1, 6-hexanediol diacrylate, trimethylolpropane triacrylate, polyethylene glycol diacrylate, neopentane diol diacrylate, polyethylene glycol diacrylate and combinations thereof, for example.

In one or more embodiments, the multifunctional monomers may be hydrophobic or hydrophilic. As used herein, the term "hydrophilic" refers to multifunctional monomers having oxygen or nitrogen atoms in their backbone structure. For example, the hydrophilic multifunctional monomers may include 2-(2-ethoxyethoxy) ethyl acrylate, tetrahydrofufuryl acrylate, polyethylene glycol (200) diacrylate, tetraethylene glycol diacrylate, triethylene glycol diacrylate, tripropylene glycol diacrylate, polyethylene glycol (400) diacrylate or combinations thereof.

The radical initiator may include any free radical initiator known to one skilled in the art. Suitable radical initiators include organic peroxides, azo-containing compounds, azide compounds and the like, peroxydicarbonate, and combinations thereof, for example. For example, the radical initiator may be a commercially available peroxide such as TRIGANOX® 301 (commercially available from Akzo-Nobel Chemicals, Inc.) or LUPERSOL® 101 (n-butylperoxy neodecanoate), for example. The radical initiator may also be a commercially available peroxydicarnobonate such as Perkadox 24L commercially available from Akzo-Nobel Chemicals. Some other components such as acrylate-based ionomers such as Dymalink 705 commercially available at Cray Valley can also readily undergo thermal polymerization, providing free radicals for the multifunctional monomers.

In one or more embodiments, contacting of the above-mentioned components may generally occur by blending the polyolefin, multifunctional monomer, and radical initiator components in a single step process. The blending may occur by introducing the polyolefin, multifunctional monomer, and radical initiator components into a system capable of combining the components to facilitate long chain branching onto the polyolefin. For example, the blending may be accomplished by introducing the polyolefin (e.g., polypropylene), multifunctional monomer into a batch mixer, continuous mixer, single screw extruder or twin screw extruder, for example, to form a homogeneous mixture or solution, introducing a free radical intiator and providing pressure and temperature conditions so as to graft copolymerize the multifunctional monomer and silane compound onto the polyolefin.

In one example, reactive extrusion may be employed to graft copolymerize the multifunctional monomer onto the polyolefin. The polyolefin, multifunctional monomer, and radical initiator components are introduced into an extruder which provides intimate contact between the components introduced therein as well as pressure and temperature conditions to permit graft polymerization multifunctional monomer onto the polyolefin.

The multifunctional monomer may participate in the grafting reaction to bridge the the polyolefin chains. During grafting, a first functional group of the multifunctional monomer reacts with the polyolefin and the first and second functional groups of the multifunctional monomer can react with another polyolefin, thereby facilitating long chain branching to the polyolefin. The polymerization of the multifunctional monomer with the polyolefin occurs readily as a result of the radical initiator forming free radicals at the functional groups of the multifunctional monomer.

Advantageously, the radical initiator acting upon the multifunctional monomer results in a substantially lower occurrence of polyolefin chain scission. During grafting, free radical reactions at the reactive functional groups of the multifunctional monomer effectively suppress radical attack and main chain scission of the polyolefin. Thus, the resulting polyolefin composition has a substantially higher molecular weight and a lower melt flow rate.

Advantageously, the use of radical initiator Perkadox results in a substantially lower occurrence of polyolefin chain scission. During melt extrusion, Perkadox free radicals can abstract tertiary hydrogen of polypropylene, and then form stable structure before incorporating with multifunctional monomers, effectively suppress beta scission of the polyolefin. Thus, the resulting polyolefin composition has a substantially higher molecular weight.

In an embodiment, the polyethylene is present in the component in an amount of from 1 wt. % to 99 wt. % by total weight of the multi-component article, alternatively from 5 wt. % to 70 wt. %, alternatively from 10 wt. % to 50 wt. %.

In another embodiment, the high-melt strength polypropylene includes a functionalized polypropylene, which includes polypropylene, a free radical initiator and a graftable monomer. The polypropylene can be a homopolymer, or a copolymer containing at least 50% by weight of polypropylene and a remaining portion of a C(2)-C(20) olefin. The polypropylene can have a crystallinity of at least 30%, and a stereoregularity of at least 60%. The polypropylene can be isotactic or syndiotactic, with a melt flow index (MFI) of from 0.1 to 100 g/10 min, optionally from 1.0 to 80 g/10 min, optionally from 5.0 to 50 g/10 min. MFI being measured according to ASTM D 1238 standard at 230° C. under a load of 2.16 kg. In embodiments of the present invention the polypropylenes can have a weight average molecular weight distribution (MWD), determined by ASTM D5296-05, ranging from 150,000 to 850,000, optionally ranging from 200,000 to 600,000, optionally ranging from 300,000 to 500,000, optionally ranging from 250,000 to 400,000, and optionally ranging from 350,000 to 400,000.

In certain embodiments, the polypropylene of the high-melt strength polypropylene can be an impact copolymer (ICP). The ICP may be one having a density range from 0.88 to 0.93 g/cm(3), optionally from 0.89 to 0.92 g/cm(3), and, optionally from 0.9 to 0.91 g/cm(3). In an embodiment, the ICP may have a melting point ranging from 155 to 170° C., optionally from 158 to 166° C., optionally from 160 to 165° C. ICP polypropylene may have a melt flow rate (MFR) ranging from 0.1 to 40 g/10 min. In an alternative embodiment, the ICP polypropylene may have a MFR ranging from 1 to 30 g/10 min, optionally from 3 to 20 g/10 min, optionally from 5 to 10 g/10 min. The ICPs used herein can have a weight average molecular weight distribution (MWD) ranging from 280,000 to 850,000, optionally ranging from 320,000 to 780,000, optionally ranging from 420,000 to 700,000.

The initiator is generally a peroxide, optionally an organic peroxide, and more particularly an alkyl peroxide, such as ditertiary butyl peroxide, tertiary butyl hydroperoxide, cumene hydroperoxide, p-menthane peroxide, p-menthane hydroperoxide (some might be repeats) tert-butylcumyl peroxide, 1,3-di(2-tert-butylper-oxyisopropyl)benzene, 2,5-dimethyl-2,5-di(tert-butyl-peroxy)hexane, di(tert-butyl)peroxide, 2,5-dimethyl2,5-di(tert-butylperoxy)-3-hexane, and 2,5-dimethyl-2,5-di-tert-butylperoxyhexane (DHBP). The peroxide can also be peroxydicarbonate such as Perkadox 24L commercially available at AkzoNobil. Damlink 705, an ionomer supplied by Cray Valley can also act as initiators through its thermal polymerization. The peroxide can range from 0.001 to 0.5% by weight, optionally from 0.01 to 0.3%, optionally from 0.01 to 0.1%, with respect to the polypropylene.

The graftable monomer generally contains a carbonyl, carboxylic acid or acid anhydride functional group and can be chosen from the following: acrylic acid, methacrylic acid, maleic acid, fumaric acid, itaconic acid, crotonic acid, citraconic acid, maleic anhydride, itaconic anhydride, crotonic anhydride and citraconic anhydride, maleic anhydride, and allyl methacrylate. The graftable monomer can range from 0.01 to 10% by weight, optionally from 0.1 to 10%, optionally from 1.0 to 5.0%, with respect to the polypropylene.

In an embodiment, the graftable monomer is maleic anhydride, and the functionalized polypropylene is maleated polypropylene. A commercial maleated PP can be used for the functionalized polypropylene, such as for example Polybond 3150 or Polybond 3200, commercially available from Chemtura.

In an embodiment, the functionalized polypropylene includes 0.1 to 10% by weight, optionally from 0.1 to 5%, optionally from 0.1 to 3%, of a multi-functional monomer, such as di-acrylates, triacrylates, etc. Multi-functional monomers can increase the degree of grafting. The multifunctional monomer can be an acrylate containing from 3 to 5 acrylate groups, such as trimethylolpropane triacrylate, trimethylolpropane ethoxylate triacrylate, glycerol propoxylate triacrylate, pentaerythritol triacrylate, di(trimethylolpropane) tetraacrylate, pentaerythritol tetraacrylate, pentaerythritol ethoxylate tetraacrylate, trimethylolpropane trimethacrylate, pentaerythritol ethoxylate triacrylate, and polyethylene glycol diacrylate.

In an embodiment, the functionalized polypropylene is maleated polypropylene, formed in the presence of an acrylate multi-functional monomer. Commercial maleated polypropylene resins can be used to make the high melt strength polypropylene; however, the reactive extrusion of polypropylene with maleic anhydride and peroxide generally involves a significant break-up of high molecular weight chains, or vis-breaking Reducing polypropylene vis-breaking during maleated PP production can increase the number of potential long chain branches that can be formed when the high melt strength polypropylene of the invention includes coupling reactions and can be beneficial for long term performance of PP-based ionomers upon neutralization.

In an embodiment, the high melt strength polypropylene includes an acid neutralizer, and the high melt strength polypropylene is a polypropylene ionomer. A graftable monomer containing a carbonyl, carboxylic acid or acid anhydride functional group can be neutralized by metal cations. For instance, maleated polypropylene contains carboxylic acids in the polymer chain. The addition of acid neutralizers yields a polypropylene ionomer. The polar groups tend to congregate, creating crosslinks throughout the polymer chain. At high temperatures, the attraction of the polar groups is weakened. Thus, the crosslinks created by acid neutralization are reversible, and it is possible to increase the melt strength of polypropylene while retaining its thermoplastic character.

Acid neutralizers used for the present invention can be salts, optionally metallic salts. The cationic portion of the metal salt can be an alkali cation, an alkaline-earth cation, or a transition-metal cation, while the anionic potion of the metal salt can be an alcoholate, carboxylate, hydroxide, oxide, alkyl, carbonate, or hydrogen-carbonate. The acid neutralizer can be chosen from the following: sodium hydroxide, calcium oxide, sodium carbonate, sodium hydrogencarbonate, sodium methoxide, sodium acetate, magnesium ethoxide, diethylzinc, aluminium butoxide, zirconium butoxide, potassium hydroxide, zinc acetate, zinc stearate, and the like. The acid neutralizer can be potassium hydroxide, zinc acetate, or zinc stearate. The acid neutralizer can be present in an amount from 0.1 to 10% by weight, optionally from 0.1 to 7.5% by weight, optionally 0.1 to 5% by weight. Small amounts of water, such as from 0.5 to 1% by weight, can be used to expedite the neutralization reaction. Acrylate ionic monomers, such as SR 732, commercially available at Sartomer, can be added to aid the neutralization reaction in an amount from 0.1 to 5% by weight, optionally from 0.1 to 2.5% by weight, optionally from 0.5 to 1% by weight.

In another embodiment, the high melt strength polypropylene includes an amine coupling agent. The amine can be chosen from the group containing C(4)-C(12)alkylene diamines, hexamethylene diamine (HMDA), polypropylene glycol)-bis-(2-propylamine) hexamethylenediamine, dodecamethylenediamine, and 1,3-phenylenediamine. A desirable coupling agent is 1,3-phenylenediamine. The amine can be present in an amount from 0.1 to 5% by weight, optionally from 0.1 to 2.5% by weight, optionally from 0.5 to 2% by weight.

In an embodiment, the high melt strength polypropylene includes maleated polypropylene, formed in the presence of an acrylate multi-functional monomer, a coupling agent, and an acid neutralizer. According to this embodiment, the interactions of the previously described embodiments are synergistically combined to enhance the melt strength of the polymer and increase long chain branching, without compromising its thermoplastic character.

In certain embodiments, the high melt strength polypropylene can further include conventional additives such as, for example, stabilizers, antioxidants, lubricants, antistatic agents, nucleating agents, foaming agents, glass fibers or any other fillers.

In certain embodiments, the components of the high melt strength polypropylene can be combined using reactive blending, such as reactive extrusion. The formation of the high melt strength polypropylene can include either one or two reactive extrusions. In one embodiment, the polypropylene, free radical initiator, graftable monomer, and optionally a multi-functional monomer, are combined in a first reactive extrusion to form a functionalized polypropylene, such as maleated polypropylene. The functionalized polypropylene can then be combined with a neutralizing agent, coupling agent, or some combination thereof in a second reactive extrusion. In other embodiments, the components of the functionalized polypropylene can be combined with the neutralizing agent, coupling agent, and other additives in a single extrusion. In any case, the order of introduction of the different components into the mixers is not critical. Such a process can be performed using any extruder type, such a twin-screw extruder, the extruder can be a device that extrudes pellets as well as an extruder which produces sheet, or any other known type. The reactive extrusion can be performed at a temperature above the melting point of the polypropylene, generally from 150° to 300° C., optionally from 160° to 250° C., or optionally from 190° to 230° C.

In an embodiment, the polyolefin is polyethylene, alternatively high density polyethylene, alternatively low density polyethylene, alternatively linear low density polyethylene.

In an embodiment, the polyolefin comprises high density polyethylene (HDPE). Herein an HDPE has a density of equal to or greater than 0.941 g/cc, alternatively from 0.941 g/cc to 0.965 g/cc, alternatively from 0.945 g/cc to 0.960 g/cc. The HDPE may be a homopolymer or a copolymer, for example a copolymer of ethylene with one or more alpha-olefin monomers such as propylene, butene, hexene, etc. In an embodiment, the HDPE is a homopolymer. An HDPE suitable for use in this disclosure may generally have a melt-mass flow rate, determined by ASTM D1238, of from 0.01 g/10 min. to 50 g/10 min., or from 0.5 g/10 min. to 20 g/10 min., or from 1.0 g/10 min. to 10 g/10 min. In an embodiment, an HDPE suitable for use in this disclosure may generally have a tensile modulus, determined by ASTM D638, of from 100,000 psi to 350,000 psi, or from 150,000 psi to 300,000 psi, or from 180,000 psi to 220,000 psi. In an embodiment, an HDPE suitable for use in this disclosure may generally have a flexural modulus, determined by ASTM D790, of from 30,000 psi to 350,000 psi, or from 100,000 psi to 300,000 psi, or from 150,000 psi to 200,000 psi. In an embodiment, an HDPE suitable for use in this disclosure may generally have a melting temperature, determined by differential scanning calorimetry (DSC), of from 120° C. to 140° C., or from 125° C. to 135° C., or from 130° C. to 133° C.

Examples of HDPEs suitable for use in this disclosure include without limitation 6450 HDPE which is a polyethylene resin and mPE ER 2283 POLYETHYLENE which is a metallocene high density polyethylene resin with hexene as comonomer, both are commercially available from Total Petrochemicals USA, Inc. In an embodiment, a suitable HDPE has generally the physical properties set forth in Table 4 (e.g., 6450 HDEP) or Table 5 (e.g., ER 2283).

TABLE 4

| Properties | Typical Value | ASTM Method |
|---|---|---|
| Resin[1] | | |
| Melt Flow Index 190° C./2.16 kg, g/10 min | 5.0 | D 1238 |
| Density, g/cm$^3$ | 0.962 | D 792 |
| Melting Point, ° F. | 265 | D 3417 |
| Film [1)(2)] | | |
| Haze, % | | |
| Gloss, % | 85 | D 523 |
| Tensile Strength @ Break (MD), psi | 3500 | D 882 |

TABLE 4-continued

| Properties | Typical Value | ASTM Method |
|---|---|---|
| Tensile Strength @ Break (TD), psi | 3800 | D 882 |
| Elongation @ Break (MD), % | 850 | D 882 |
| Elongation @ Break (TD), % | 650 | D 882 |
| Secant Modulus @ 2% Strain (MD), psi | 100,000 | D 882 |
| Secant Modulus @ 2% Strain (TD), psi | 130,000 | D 882 |
| WVTR[3] @ 100° F., g/100 in²/day | 0.5 | E 96/66 |
| Low Temp. Brittleness, ° F. | <−112 | D 746 |

[1] Data developed under laboratory conditions and are not to be used as specification, maxima or minima.
[2] The data listed were determined on 1.0 mil cast film.
[3] Water Vapor Transmission Rate.

TABLE 5

| Properties | Method | Unit | Value |
|---|---|---|---|
| Physical | | | |
| Density | ISO 1183 | g/cm³ | 0.950 |
| Melt Index (2.16 kg) | ISO 1133 | g/10 min | 2.0 |
| Melting Point | EN ISO 11357 | ° C. | 133 |
| Vicat Temperature | ISO 306 | ° C. | 130 |

TABLE 5-continued

| Properties | Method | Unit | Value |
|---|---|---|---|
| Cast Film | | | |
| Dart Impact | ISO 7765-1 | g | 36 |
| Tensile Strength at Yield MD/TD | ISO 527-3 | MPa | 23/24 |
| Tensile Strength at Break MD/TD | ISO 527-3 | MPa | 43/41 |
| Elongation at Break MD/TD | ISO 527-3 | % | 640/820 |
| Elmendorf MD/TD | ISO 6393 | N/mm | 8/130 |
| Haze | ISO 14782 | % | 10 |
| Gloss 45° | ASTM D 2457 | | 68 |

In an embodiment, the polyolefin comprises a low density polyethylene (LDPE). Herein an LDPE is defined as having a density range of from 0.910 g/cm³ to 0.940 g/cm³, alternatively from 0.917 g/cm³ to 0.935 g/cm³, and alternatively from 0.920 g/cm³ to 0.930 g/cm³. The LDPE may be further characterized by the presence of increased branching when compared to an HDPE. The LDPE may be a homopolymer or a copolymer, for example a copolymer of ethylene with one or more alpha-olefin monomers such as propylene, butene, hexene, etc. In an embodiment, the LDPE is a homopolymer. An LDPE suitable for use in this disclosure may generally have a melt-mass flow rate, determined by ASTM D1238, of from 0.1 g/10 min. to 60 g/10 min., or from 0.5 g/10 min. to 30 g/10 min., or from 1 g/10 min. to 20 g/10 min. In an embodiment, an LDPE suitable for use in this disclosure may generally have a tensile modulus, determined by ASTM D638, of from 10,000 psi to 70,000 psi, or from 15,000 psi to 65,000 psi, or from 20,000 psi to 60,000 psi. In an embodiment, an LDPE suitable for use in this disclosure may generally have a flexural modulus, determined by ASTM D790, of from 9,000 psi to 60,000 psi, or from 10,000 psi to 55,000 psi, or from 15,000 psi to 50,000 psi. In an embodiment, an LDPE suitable for use in this disclosure may generally have a melting temperature, determined by differential scanning calorimetry (DSC), of from 85° C. to 125° C., or from 90° C. to 120° C., or from 95° C. to 120° C.

A representative example of a suitable LDPE is 1020 FN 24, which is an LDPE commercially available from Total Petrochemicals USA, Inc. The LDPE (e.g., 1020 FN 24) may generally have the physical properties set forth in Table 6.

TABLE 6

| | English | SI | Method |
|---|---|---|---|
| Nominal Resin Properties | | | |
| Density | — | 0.922 g/cm³ | ASTM D1505 |
| Melt Index, 190° C./2.16 Kg | — | 2.1 g/10 min | ASTM D1238 |
| Melting Point | 232° F. | 109° C. | ASTM D3418 |
| Vicat Softening Temperature | 209° F. | 94° C. | ASTM D1525 |
| Nominal Blown Film Properties at 40 um[1] | | | |
| Haze | 7.0% | 7.0% | ASTM D1003 |
| Tensile Strength at Yield MD/TD | 1595 psi/1523 psi | 11 MPa/10.5 MPa | ISO 527-3 |
| Tensile Strength at Break MD/TD | 4061 psi/3190 psi | 28/22 MPa | ISO 527-3 |
| Elongation at Break MD/TD | 360%/630% | 360%/630% | ISO 527-3 |
| Elmendorf MD/TD | — | 75/45 N/mm | ISO 6383-2 |
| Dart test | — | 120 g | ISO 7765-1 |
| Haze | 7% | 7% | ISO 14782 |

[1] Data are obtained using laboratory test specimens produced with the following extrusion conditions: 45 mm screw diameter, L/D = 30, die diameter = 120 mm, die gap = 1.4 mm, BUR = 2.5:1, temperature = 185° C.

In an embodiment, the polyolefin comprises a linear low density polyethylene (LLDPE). LLDPE is a substantially linear polyethylene, with significant numbers of short branches. LLDPE is commonly generated by the copolymerization of ethylene with longer chain olefins. LLDPE differs structurally from low-density polyethylene because of the absence of long chain branching. In an embodiment, the LLDPE is a copolymer, for example a copolymer of ethylene with one or more alpha-olefin monomers such as propylene, butene, hexene, etc. An LLDPE suitable for use in this disclosure may generally have a density, determined by ASTM D792, of from 0.900 g/cc to 0.920 g/cc, or from 0.905 g/cc to 0.918 g/cc, or from 0.910 g/cc to 0.918 g/cc. In an embodiment, an LLDPE suitable for use in this disclosure may generally have a melt-mass flow rate, determined by ASTM D1238, of from 0.1 g/10 min. to 50 g/min., or from 0.5 g/10 min. to 30 g/10 min., or from 1 g/10 min. to 20 g/10 min. In an embodiment, an LLDPE suitable for use in this disclosure may generally have a tensile modulus, determined by ASTM D638, of from 20,000 psi to 250,000 psi, or from 50,000 psi to 220,000 psi, or from 100,000 psi to 200,000 psi. In an embodiment, an LLDPE suitable for use in this disclosure may generally have a flexural modulus, determined by ASTM D790, of from 5,000 psi to 150,000 psi, or from 10,000 psi to 130,000 psi, or from 50,000 psi to 110,000 psi. In an embodiment, an LLDPE suitable for use in this disclosure may generally have a melting temperature, determined by differential scanning calorimetry (DSC), of from 70° C. to 140° C., or from 80° C. to 130° C., or from 90° C. to 120° C.

A representative example of a suitable LLDPE is FINATHENE LL 4010 FE 18, which is an LLDPE commercially available from Total Petrochemicals. The LLDPE (e.g., FINATHENE LL 4010 FE 18) may generally have the physical properties set forth in Table 7.

TABLE 7

|  | English | SI | Method |
|---|---|---|---|
| Nominal Resin Properties | | | |
| Density | — | 0.918 g/cm$^3$ | ASTM D792 |
| Melt Index | — | 1.0 g/10 min | ASTM D1238 |
| Nominal Film Properties at 0.984 mil (25 um) | | | |
| Film Tensile Strength at Yield, MD | 1600 psi | 11.0 MPa | ISO 527 |
| Film Tensile Strength at Yield, TD | 1600 psi | 11.0 MPa | ISO 527 |
| Film Elongation at Break, MD | 600% | 600% | ISO 527 |
| Film Elongation at Break, TD | 750% | 750% | ISO 527 |
| Secant Modulus, MD | 23.2 ksi | 0.160 GPa | ISO 5527 |
| Secant Modulus, TD | 24.7 ksi | 0.170 GPa | ISO 5527 |
| Dart Drop Test | 0.198 lb | 90.0 g | ISO 7765-1 |
| Film Tensile Strength at Break, MD | 5800 psi | 40.0 MPa | ISO 527 |
| Film Tensile Strength at Break, TD | 4350 psi | 30.0 MPa | ISO 527 |
| Thermal Properties | | | |
| Melting Point | 252° F. | 122° C. | ISO 11357-3 |
| Optical Properties | | | |
| Haze | 10.0% | 10.0% | ASTM D 1003 |

Polyolefins suitable for use in this disclosure (e.g., polypropylene, polyethylene) may be prepared using any suitable method. For example, the polyolefin may be prepared using a Ziegler-Natta catalyst, metallocene catalyst, or combinations thereof. The polyethylene, for example, may be prepared using a chromium oxide catalyst, or any other suitable catalysts.

In an embodiment, the polyolefin is prepared using Ziegler-Natta catalysts, which are typically based on titanium and organometallic aluminum compounds, for example triethylaluminum $(C_2H_5)_3Al$. Ziegler-Natta catalysts and processes for forming such catalysts are described in U.S. Pat. Nos. 4,298,718; 4,544,717; and 4,767,735, each of which is incorporated by reference herein in its entirety.

In another embodiment, the polyolefin may be prepared using a metallocene catalyst. Metallocene catalysts may be characterized generally as coordination compounds incorporating one or more cyclopentadienyl (Cp) groups (which may be substituted or unsubstituted, each substitution being the same or different) coordinated with a transition metal through π bonding. Examples of metallocene catalysts and processes for forming such catalysts are described in U.S. Pat. Nos. 4,794,096 and 4,975,403, each of which is incorporated by reference herein in its entirety. Examples of polyolefins prepared through the use of metallocene catalysts are described in further detail in U.S. Pat. Nos. 5,158,920; 5,416,228; 5,789,502; 5,807,800; 5,968,864; 6,225,251; 6,777,366; 6,777,367; 6,579,962; 6,468,936; 6,579,962; and 6,432,860, each of which is incorporated by reference herein in its entirety.

The polyolefin may also be prepared using any other catalyst or catalyst system such as a combination of Ziegler-Natta and metallocene catalysts, for example as described in U.S. Pat. Nos. 7,056,991 and 6,653,254, each of which is incorporated by reference herein in its entirety.

The polyolefin may be formed by placing one or more olefin monomer (e.g., ethylene, propylene) alone or with other monomers in a suitable reaction vessel in the presence of a catalyst (e.g., Ziegler-Natta, metallocene, etc.) and under suitable reaction conditions for polymerization thereof. Any suitable equipment and processes for polymerizing the olefin into a polymer may be used. For example, such processes may include solution phase, gas phase, slurry phase, bulk phase, high pressure processes or combinations thereof. Such processes are described in detail in U.S. Pat. Nos. 5,525,678; 6,420,580; 6,380,328; 6,359,072; 6,346,586; 6,340,730; 6,339,134; 6,300,436; 6,274,684; 6,271,323; 6,248,845; 6,245,868; 6,245,705; 6,242,545; 6,211,105; 6,207,606; 6,180,735; and 6,147,173, which are incorporated herein by reference in their entirety.

In an embodiment, the polyolefin is formed by a gas phase polymerization process. One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from 100 psig to 500 psig, or from 200 psig to 400 psig, or from 250 psig to 350 psig. The reactor temperature in a gas phase process may vary from 30° C. to 120° C., or from 60° C. to 115° C., or from 70° C. to 110° C., or from 70° C. to 95° C., for example as described in U.S. Pat. Nos. 4,543,399; 4,588,790; 5,028,670; 5,317,036; 5,352,749; 5,405,922; 5,436,304; 5,456,471; 5,462,999; 5,616,661; 5,627,242; 5,665,818; 5,677,375; and 5,668,228, which are incorporated herein by reference in their entirety.

In an embodiment, the polyolefin is formed by a slurry phase polymerization process. Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutene). The medium employed is generally liquid under the conditions of polymerization and relatively inert. A bulk phase process is similar to that of a slurry process. However, a process may be a bulk process, a slurry process or a bulk slurry process.

In certain embodiments, the single pellet blend includes polylactic acid. Any suitable polylactic acid may be used in this disclosure. For example, polylactic acid may comprise poly-L-lactide (PLLA), poly-D-lactide (PDLA), poly-LD-lactide (PDLLA), or combinations thereof. The polylactic acid may be amorphous or semi-crystalline.

Polylactic acid may be prepared using any suitable method. For example, polylactic acid may be prepared by dehydration condensation of lactic acid, such as described in U.S. Pat. No. 5,310,865, which is incorporated herein by reference in its entirety. Alternatively, polylactic acid may be prepared by synthesis of a cyclic lactide (also known as cyclic dimer) from lactic acid followed by ring opening polymerization of the cyclic lactide. An example of such a process is described in U.S. Pat. No. 2,758,987, which is incorporated herein by reference in its entirety.

Catalysts may be used in the production of polylactic acid. The catalysts may be of any type suitable for the process. Examples of such catalysts include without limitation tin compounds such as tin octylate, titanium compounds such as tetraisopropyl titanate, zirconium compounds such as zirconium isopropoxide, and antimony compounds such as antimony trioxide.

Additives such as those described previously may be introduced to the polylactic acid composition. Additional processes to produce polylactic acid are described in U.S. Pat. Nos. 5,821,327; 5,770,682; 5,508,378; 5,470,944; and 4,797,468, which are incorporated herein by reference in their entirety.

In an embodiment, a polylactic acid suitable for use in this disclosure may have a density of from 1.238 g/cc to 1.265 g/cc, alternatively from 1.24 g/cc to 1.26 g/cc, and alternatively from 1.245 g/cc to 1.255 g/cc as determined in accordance with ASTM D792; a melt index (210° C., 2.16 kg) of from 5 g/10 min. to 35 g/10 min., alternatively from 10 g/10 min. to 30 g/10 min., and alternatively from 10 g/10 min. to 20 g/10 min as determined in accordance with ASTM D1238; a crystalline melt temperature of from 150° C. to 180° C., alternatively from 160° C. to 175° C., and alternatively from 160° C. to 170° C. as determined in accordance with ASTM D3418; a glass transition temperature of from 45° C. to 85° C., alternatively from 50° C. to 80° C., and alternatively from 55° C. to 75° C. as determined in accordance with ASTM D3417; a tensile yield strength of from 4,000 psi to 25,000 psi, alternatively from 5,000 psi to 20,000 psi, and alternatively from 5,500 psi to 20,000 psi as determined in accordance with ASTM D638; a tensile elongation of from 1.5% to 10%, alternatively from 2% to 8%, and alternatively of from 3% to 7% as determined in accordance with ASTM D638; a flexural modulus of from 250,000 psi to 600,000 psi, alternatively from 300,000 psi to 550,000 psi, and alternatively from 400,000 psi to 500,000 psi as determined in accordance with ASTM D790; a notched Izod impact of from 0.1 ft-lb/in to 0.8 ft-lb/in, alternatively from 0.2 ft-lb/in to 0.7 ft-lb/in, and alternatively from 0.4 ft-lb/in to 0.6 ft-lb/in as determined in accordance with ASTM D256.

Exampled of polylactic acid suitable for use in this disclosure include without limitation, semi-crystalline polylactic acid, including, but not limited to NatureWorks PLA3251, NatureWorks PLA6201, NatureWorks PLA6202 or amorphous polylactic acids including, but not limited to, NatureWorks PLA4060, all of which are commercially available from Nature Works LLC.

The polylactic acid may include additives and modifiers. In certain embodiments, the polylactic acid may include stabilizers, ultra-violet screening agents, oxidants, anti-oxidants, antistatic agents, ultraviolet light absorbents, fire retardants, processing oils, mold release agents, coloring agents, pigments/dyes, nucleators, plasticizers, regular and nano-fillers, stereocomplex polylactic acids, chain extenders, and combinations thereof. In certain embodiments, the chain extender may be an acrylic copolymer, such as Biostrength 700 manufactured by Biostrength, or a peroxide. The aforementioned additives may be used either singularly or in combination to form various formulations of the polymer. These additives may be included in amounts effective to impart the desired properties.

In some embodiments of the present disclosure, the third component is a peroxide. Non-limiting examples of peroxides include Luperox-101 and Tigonix-301. The amount of peroxide in the polyolefin/polylactic acid blend may be from about 200 ppm to about 9000 ppm by weight.

In certain embodiments of the present disclosure, the third component may be a cavitating booster. The cavitating booster may comprise a functionalized polyolefin, for example, polypropylene, such as a polypropylene that is functionalized with a polar monomer. Examples of such polar monomers include without limitation maleic anhydride (MAH); acrylic acid; alkyl acrylic acid; vinylsulfonic acid; acrylamido-2-methyl-propanesulfonic acid; alkyl sulfonic acid; acrylonitrile; acrylate esters for example methylmethacrylate; styrene sulfonic acid; and the like; and combinations thereof. In an embodiment, the cavitating booster comprises polypropylene functionalized with maleic anhydride which is hereinafter termed maleated polypropylene (PP-g-MAH).

Examples of cavitating boosters suitable for use in this disclosure include without limitation POLYBOND-3002 and X-10083, which are PP-g-MAH and both are commercially available from Crompton Corporation. In an embodiment, a cavitating booster suitable for use in this disclosure (e.g., POLYBOND-3002) may generally have the physical properties set forth in Table 5.

TABLE 5

| Physical Properties | POLYBOND-3002 Typical Value | Test Method |
| --- | --- | --- |
| Melt Flow Rate (MFR), g/10 min. | 9.3 | ASTM D1238 |
| MAH Index | 0.6 | FTIR |
| % Moisture | 0.02 | ASTM D789 |
| Yellowness Index | 4 | ASTM D5290 |

In an embodiment, the cavitating booster is present in the blend in an amount of from 0.5 weight percent (wt. %) to 15 wt. % by total weight of the blend, alternatively from 2 wt. % to 10 wt. %, alternatively from 3 wt. % to 5 wt. %.

In an embodiment, the cavitating booster is a maleic anhydride grafted PP with MAH content in an amount of from 0.2 wt. % to 15 wt. % by total weight of maleated PP, alternatively from 0.5 wt. % to 10 wt. %, alternatively from 0.5 wt. % to 5 wt. %.

In certain other embodiments, the single pellets include a reactive modifier as a third component. Herein, reactive modifiers refer to polymeric additives that when added to a molten polyolefin and PLA (e.g., PP/PLA blend or PE/PLA blend) form compounds in situ that serve to stabilize the interface between the polyolefin and PLA. The compounds formed in situ act as compatibilizers and the reactive modifiers are precursors to these compatibilizers.

In certain embodiments, the reactive modifier includes, but is not limited to, SEBS, an ethylene methacrylate copolymer, an ethylene vinyl acetate copolymer, and an epoxy-functionalized polyolefin. Examples of epoxy-functionalized polyolefins suitable for use in this disclosure include without limitation epoxy-functionalized polypropylene, including, but not limited to, glycidyl methacrylate grafted polypropylene (PP-g-GMA), epoxy-functionalized polyethylene, including, but not limited to, polyethylene co glycidyl methacrylate (PE-co-GMA), or combinations thereof. An example of an epoxy-functionalized polyethylene suitable for use in this disclosure includes LOTADER AX8840, which is a PE-co-GMA containing 8% GMA that is commercially available from Arkema.

In another embodiment, the reactive modifier comprises PP-g-GMA. PP-g-GMA may be prepared by any suitable method such as for example by grafting GMA onto polypropylene in the presence of an initiator such as peroxide. Examples of initiators suitable for use in this disclosure include without limitation LUPERSOL 101 and TRIG-ANOX 301, which are peroxides commercially available from Arkema. In an embodiment, the initiator may be used in an amount of from 0.03% to 2 wt. % by total weight of the biodegradable polymeric compositions, alternatively from 0.2 wt. % to 0.8 wt. %, alternatively from 0.3 wt. % to 0.5 wt. %.

The grafting reaction of GMA onto PP may be conducted in a molten state inside an extruder such as for example a single extruder or a twin-screw extruder. Hereinafter, such process is referred to as reactive extrusion. A feedstock comprising PP, GMA, and initiator (i.e., peroxide) may be fed into an extruder reactor sequentially along the extruder, alternatively the feedstock (i.e., PP, GMA, and initiator) may be pre-mixed outside and fed into the extruder.

In an alternative embodiment, the PP-g-GMA is prepared by grafting GMA onto polypropylene in the presence of an initiator and a multi-functional acrylate comonomer. The multi-functional acrylate comonomer may comprise polyethylene glycol diacrylate, trimethylolpropane triacrylate (TMPTA), or combinations thereof.

The multi-functional acrylate comonomer may be further characterized by a high flash point. The flash point of a material is the lowest temperature at which it can form an ignitable mixture in air, as determined in accordance with ASTM D93. The higher the flash point, the less flammable the material, which is a beneficial attribute for melt reactive extrusion. In an embodiment, the multi-functional acrylate comonomer may have a flash point of from 50° C. to 120° C., alternatively of from 70° C. to 100° C., alternatively of from 80° C. to 100° C. Examples of multi-functional acrylate comonomers suitable for use in this disclosure include without limitation SR259 (polyethylene glycol diacrylate), CD560 (alkoxylated hexanediol diacrylate), and SR351 (TMPTA), which are commercially available from Sartomer.

The grafting reaction of GMA onto polypropylene in the presence of a peroxide and the multi-functional acrylate comonomer polyethylene glycol diacrylate is depicted in Scheme 1.

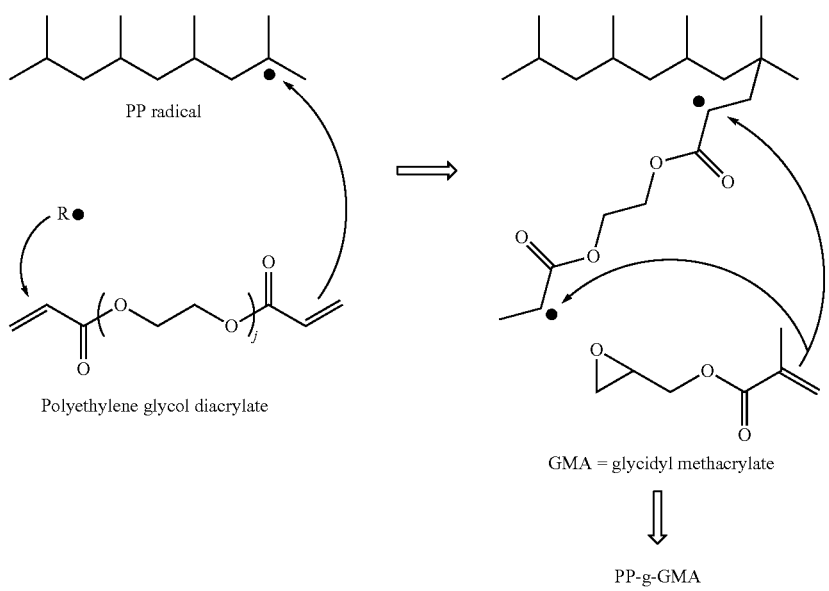

Without wishing to be limited by theory, the hydrogens on the tertiary carbon of polypropylene molecules can be easily abstracted in the presence of peroxide during reactive extrusion, forming polypropylene macroradicals with unpaired electrons. The polypropylene macroradicals, which are generally unstable, tend to form free radicals through a step referred to as "β-scission." β-scission refers to a family of reactions wherein bonds that are in beta-position to a radical are cleaved resulting in the formation of a double bond and a new radical. The β-scission reaction is believed to be responsible mainly for the formation of internal double bonds thus its occurrence is correlated with the allylic content of the final polymer. β-scission is typically favored over the grafting reaction (i.e., the addition of the GMA) resulting in both a lower grafting of GMA and a polypropylene having a lower average molecular weight. However, in the reactions comprising a multi-functional acrylate comonomer, the multi-functional acrylate comonomer may function to readily capture the polypropylene micro-radicals resulting in the formation of a more stable intermediate (i.e., polypropylene-acrylate radicals). The relatively stable propylene-acrylate radicals tend to react more readily with GMA, which is an acrylate type monomer, and consequently favor the grafting reaction.

Furthermore, as shown in Scheme 1, multiple free radicals may exist on the grafted propylene-acrylate molecules thus making it easier to capture and initiate the reaction of GMA. The reactivity of GMA towards acrylate free radicals may be higher than towards polypropylene tertiary macro-radicals.

Consequently, PP-g-GMA prepared using a reaction mixture comprising a multi-functional acrylate comonomer may display a higher degree of grafting than a PP-g-GMA prepared using an otherwise similar composition in the absence of a multi-functional acrylate comonomer. PP-g-GMA prepared using a multifunctional acrylate comonomer is hereinafter referred to as a highly grafted GMA (HG-GMA).

In an embodiment, the HGGMA which is a reactive modifier, is prepared from a reaction mixture comprising polypropylene present in an amount of from 80 wt. % to 99.5 wt. %, alternatively from 90 wt. % to 99 wt. %, and alternatively from 95 wt. % to 99 wt. %; GMA present in an amount of from 0.5 wt. % to 20 wt. %, alternatively from 1.0 wt. % to 10 wt. %, and alternatively from 1.0 wt. % to 5.0 wt. %; a multi-functional acrylate comonomer (e.g., SE259) present in an amount of from 0.5 wt. % to 15 wt. %, alternatively from 1.0 wt. % to 10 wt. %, and alternatively from 1.0 wt. % to 5.0 wt. %; and an initiator (e.g. LUPERSOL 101) present in an amount of from 0.05 wt. % to 1.5 wt. %, alternatively from 0.2 wt. % to 0.8 wt. %, and alternatively from 0.3 wt. % to 0.5 wt. %. The ratio of GMA: multi-functional acrylate comonomer in the HGGMA may range from 1:5 to 10:1, alternatively from 1:2 to 5:1, and alternatively from 1:1 to 3:1.

The amount of grafting of GMA onto the polyolefin may vary depending on a variety of factors such as the type of materials used and processing conditions. Such parameters may be varied by one of ordinary skill in the art with the benefits of this disclosure to produce reactive modifiers having a user-desired grafting yield.

The grafting yield may be determined using any suitable method. For example, the grafting yield may be determined by Fourier Transform Infrared Spectroscopy (FTIR) spectroscopy. In an embodiment, a method for determining the grafting yield comprises obtaining the FTIR spectra of polymeric samples having a mixture of PP and GMA wherein the amount of each component is known. A calibration curve may be generated by plotting the signal intensity at one or more wavelengths as a function of component concentration. The FTIR spectra of a PP-g-GMA sample may then be determined and compared to the calibration curve in order to determine the grafting yield. This method is described in more detail in Angew. Makromol. Chem, 1995, V229 pages 1-13. In an embodiment, a HGGMA may have a grafting yield of from 0.2 wt. % to 15 wt. %, alternatively from 0.5 wt. % to 10 wt. %, alternatively from 1.0 wt. % to 5.0 wt. %.

In an embodiment, the reactive modifier is present in the component in an amount of from 0.5 wt. % to 15 wt. % based on total weight of the single pellet, alternatively from 1.0 wt. % to 10 wt. %, alternatively from 3.0 wt. % to 5.0 wt. %.

The single pellet may be formed in a one-step compounding process or a multi-step compounding process. For instance, in certain embodiments, the blends may be compounded in an extruder, such as a twin screw extruder, and then pelletized. In other embodiments, the single pellet may be formed by mechanically mixing the components of the blend, extruded, and then pelletized. In still other embodiments, such as those blends that include a peroxide or other chain extender, the blend may be reactively extruded and then pelletized.

As one of ordinary skill in the art will recognize with the benefit of this disclosure, the various combinations of polyolefin, polylactic acid and optional third component are within the scope of this disclosure. The following formulations are particular, non-limiting embodiments of the present disclosure.

Single Pellet Formulations for Heat Seal or Seal-Peel Film Applications:

Certain embodiments of the present disclosure are directed to single pellets formulations for use in heat seal and seal-peel film applications. These embodiments include blends of polyolefins with polylactic acid, which may include a third component. The polyolefin may be a metallocene propylene random copolymer, including, but not limited to LX5 02-15, a Ziegler-Natta propylene random copolymers such as Total Petrochemicals 6000-, 8000-, and 9000-series, or a metallocene-catalyzed HDPE. The polylactic acid may be semi-crystalline or amorphous, such as NatureWorks PLA4060. When present, the third component may be an epoxy-functionalized polyethylene, an epoxy-functionalized polypropylene, SEBS, ethylene methacrylate copolymer, or an ethylene-vinyl acetate copolymer. Articles made from these formulations include single and multi-layer films which may include one or more heat seal or seal-peel layers.

Single Pellet Formulations for Opaque BOPP Films

Certain embodiments of the present disclosure are directed to single pellets formulations for use in opaque BOPP film applications. These embodiments include blends of polyolefins with polylactic acid, which may include a third component. The polyolefin may be a Ziegler-Natta or metallocene-catalyzed polypropylene homopolymer, random copolymer, or impact copolymer. The polyolefin may also be an HDPE. The polylactic acid may be any polylactic acid, including, but not limited to semi-crystalline polylactic acids such as NatureWorks PLA6201, NatureWorks PLA6202, or NatureWorks PLA 3251. When present, the third component may be a maleated polyolefins. The single pellets may also include other additives such as PP and PLA nucleators, regular fillers such as calcium carbonate or nanofillers, etc. Articles made from these formulations include single and multi-layer films with one or more opaque BOPP film layers.

Single Pellet Formulations for Clear BOPP Films

Certain embodiments of the present disclosure are directed to single pellets formulations for use in opaque BOPP film applications. These embodiments include blends of polyolefins with polylactic acid, which may include a third component. The polyolefin may be a Ziegler-Natta or metallocene-catalyzed polypropylene homopolymer or random copolymer. The polyolefin may also be an HDPE. The polylactic acid may be an amorphous or semi-crystalline polylactic acid. When present, the third component may be an epoxy-functionalized polyethylene, an epoxy-functionalized polypropylene, SEBS, ethylene methacrylate copolymer, or an ethylene-vinyl acetate copolymer. Articles made from these formulations include single and multi-layer films with one or more clear BOPP film layers.

High Melt Strength Single Pellet Formulations for Blown Film, Extrusion Molding, Extrusion Thermoforming, and Foaming Applications Certain embodiments of the present disclosure are directed to single pellets formulations for use in blow film, extrusion molding, extrusion thermoforming and foaming applications. These embodiments include blends of polyolefins with polylactic acid, which may include a third component. The polyolefin may be a polypropylene or polyethylene. In some embodiments, the polypropylene is a high melt strength polypropylene. The high melt strength polypropylene may be obtained from commercial source such as Borealis WB-140 or be produced by reactive extrusion technologies including extrusion of regular polypropylene with a multifunctional monomer such as Sartomer SR351 in the presence of peroxide, coupling or neutralization of functional PP such as maleated PP, addition of ionomers such as Cray Valley Dymalink 705, or combinations thereof. The polylactic acid may be an amorphous or semi-crystalline polylactic acid, The polylactic acid may include a chain modifier, including, but not limited to an acrylic copolymer, such as Biostrength 700 manufactured by Biostrength, or a peroxide or a filler. When present, the third component may be an epoxy-functionalized polyethylene, an epoxy-functionalized polypropylene, SEBS, ethylene methacrylate copolymer, or an ethylene-vinyl acetate copolymer. Articles made from these formulations include single and multi-layer blown films or articles manufactured by extrusion molding, extrusion thermoforming or foaming.

Single Pellet Formulations for Injection Molding Automotive Interiors and Other Durable Goods Certain embodiments of the present disclosure are directed to single pellets formulations for use in injection molding automotive interiors and other durable goods applications. These embodiments include blends of polyolefins with polylactic acid, which may include a third component. The polyolefin may be a polypropylene or HDPE. In some embodiments, the polypropylene is a Ziegler-Natta polypropylene impact copolymer. More rubbers such as EPDM may be added to adjust mechanical properties of the formulations. The polylactic acid may be a semi-crystalline polylactic acid. The polylactic acid may include a chain modifier, including, but not limited to an acrylic copolymer, such as Biostrength 700 manufactured by Biostrength, or a peroxide, or a filler. When present, the third component may be an epoxy-functionalized polyethylene, an epoxy-functionalized polypropylene, SEBS, ethylene methacrylate copolymer, or an ethylene-vinyl acetate copolymer. Articles made from these formulations include articles such as automotive interiors and other durable goods.

Single Pellet Formulations for Hot Melt Adhesives

Certain embodiments of the present disclosure are directed to single pellets formulations for use in hot melt adhesives. These embodiments include blends of polyolefins with polylactic acid made with a peroxide. The polyolefin may be a Ziegler-Natta or metallocene polypropylene homopolymer, random copolymer, or impact copolymer. The polylactic acid may be a semi-crystalline or amorphous polylactic acid. The polylactic acid may include as a modifier a plasticizer, a nucleator, a regular or nano-filler, or a stereocomplex polylactic acid. Peroxides include Luperox-101, Trigonix-301, and any peroxides used in polyolefins. The amount of the peroxide in the blend ranges from 100 ppm to 20000 ppm by weight of the blend. Hot melt adhesives may be made from these formulations.

Single Pellet Formulations for Other Applications such as Injection Stretch Blow Molding (ISBM), Fiber and Tape.

Certain embodiments of the present disclosure are directed to single pellets formulations for use in ISBM, fiber and tape. These embodiments include blends of polyolefins with polylactic acid, which may include a third component. The polyolefin may be a Ziegler-Natta or metallocene polypropylene homopolymer, random copolymer, or impact copolymer. The polyolefin may also be an HDPE. The polylactic acid may be a semi-crystalline polylactic acid. The polylactic acid may include as a modifier a plasticizer, a nucleator, a regular or nano-filler, or a stereocomplex polylactic acid. When present, the third component may be an epoxy-functionalized polyethylene, an epoxy-functionalized polypropylene, SEBS, ethylene methacrylate copolymer, or an ethylene-vinyl acetate copolymer. Articles made from these formulations include ISBM films, fibers and tapes.

In certain non-limiting embodiments of the present disclosure, the single pellet may be formed by the extruder immediately preceding the extruder that forms an article.

EXAMPLES

The disclosure having been generally described, the following examples are given as particular embodiments of the disclosure and to demonstrate the practice and advantages thereof. It is understood that the examples are given by way of illustration and are not intended to limit the specification or the claims to follow in any manner.

Example 1

Figure 2:
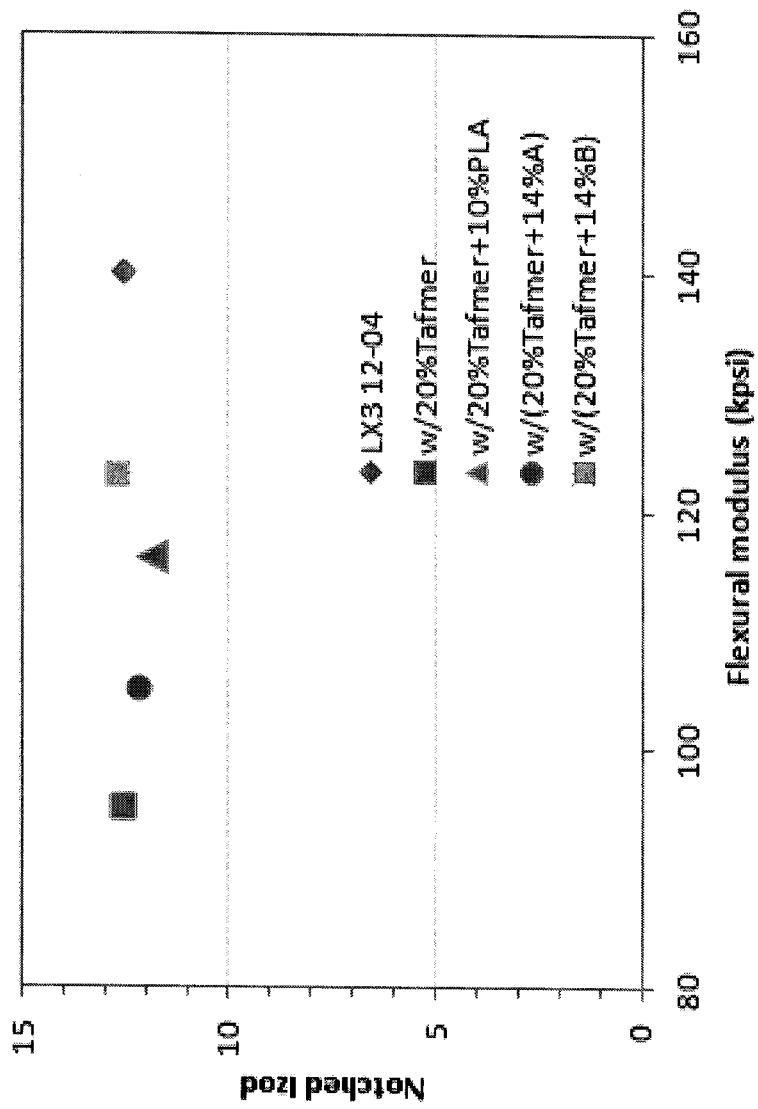
FIG. 2 is a graph depicting the stiffness/impact balance of injection molded materials made in conjunction with at least one embodiment of the present disclosure.
Figure 3:
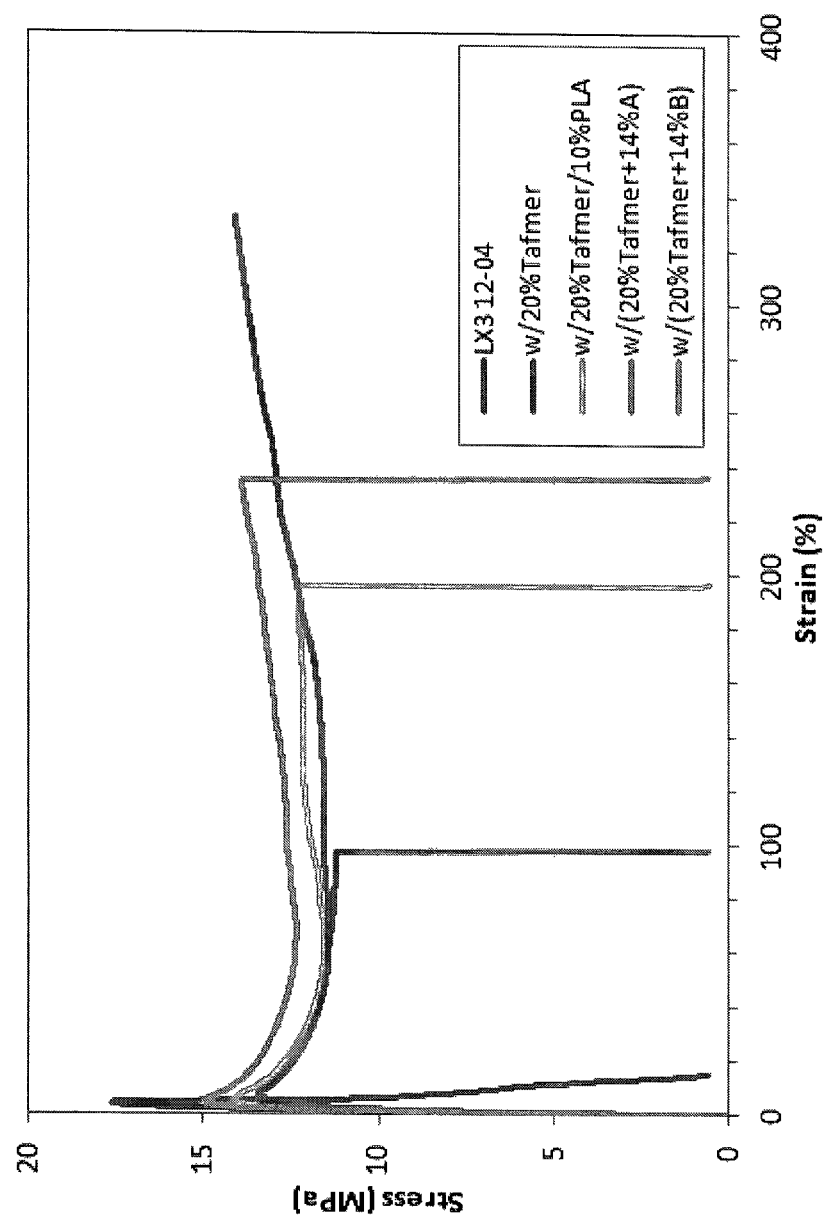
FIG. 3 is a graph depicting the tensile mechanical properties of injection molded materials made in conjunction with at least one embodiment of the present disclosure.

The single pellets can be further produced in a way that PLA phases can be selectively encapsulated inside rubber domains, which lead to superior stiffness/impact balance. One example is a formulation based on Total Petrochemicals LX3 12-04, a 13 g/10 min melt flow CRed from 2.0 g/10 min impact copolymers with ethylene content of ~16%. LX3 12-04 was blended with 20% Tafmer (EPDM rubber) and 10% PLA. Rubber and PLA may exist as separate dispersed phases in polypropylene matrix. However, when PLA and functional polyolefins such as epoxy-functional polypropylene (labeled as A) made at Total Petrochemicals or epoxy-functionalized polyethylene supplied by Arkema such as Lotader AX8400 (labeled as B) were premixed before compounding with polypropylene, PLA phases can be encapsulated inside rubber phases in polypropylene matrix (see FIG. 1). FIG. 1 depicts a blend of LX3 12-04/20% Tafmer/10% PLA with separate rubber and PLA dispersed phases (left), and with PLA phases encapsulated inside rubber phases (right). The advantages of the controlled phase morphology may include superior stiffness balance especially for injection molding formulations with lower rubber contents, as well as increase efficiency of rubber use for polypropylene modifications, just to name a few. The materials with these controlled morphology exhibit good mechanical properties especially tensile properties with significantly high elongation at break (FIG. 2 and FIG. 3). FIG. 2 depicts notched Izod (foot·pound/inch, as determined by ASTM D-256A) versus flexural modulus (as measured by ASTM D-790). FIG. 3 is a tensile test (as measured by ASTM D-638)

Example 2

Figure 4:
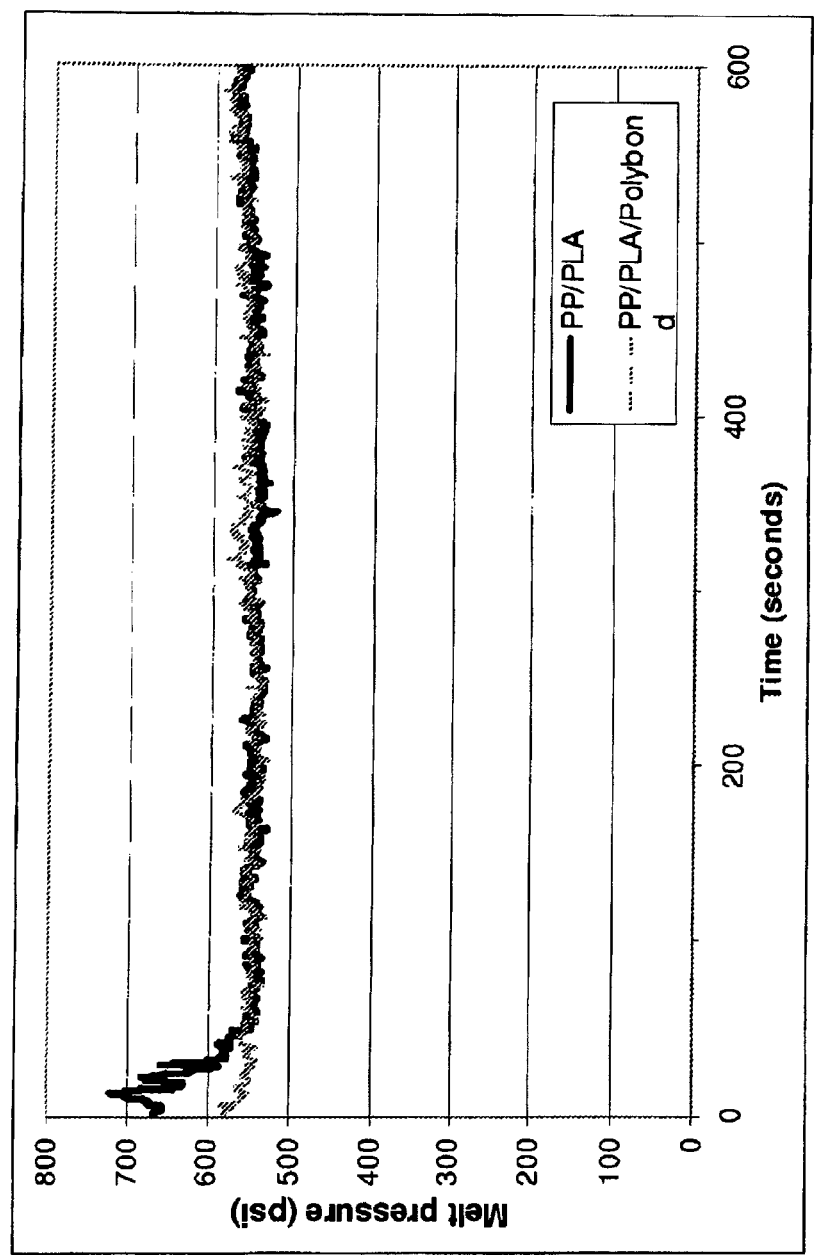
FIG. 4 is a plot of melt pressure during extrusion for the samples from the Example.

The melt pressures of PP/PLA blends made with and without a cavitating booster were investigated. Sample 1 was prepared by blending Total Petrochemicals polypropylene 3271 with 10% PLA 6201D (previously dried at 75° C. for 6 hours under vacuum prior to extrusion). Sample 2 was prepared by blending 3271, 10% PLA 6201, and 5% POLYBOND 3002 containing 0.6% maleic anhydride (MAH) grafted onto polypropylene (maleated polypropylene). The blended mixtures were extruded in a 27 mm co-rotating twin screw extruder. The screw speed of the extruder was set at 100 rpm and the output rate was at 15 lbs/hr. Devol ports were vacuumed to remove any volatiles generated during extrusion The melt pressure data as a function of extrusion time is shown in FIG. 4. Referring to FIG. 4, Sample 2 (containing the cavitating agent) had a higher melt pressure at earlier extrusion times. Later times show that the melt pressure of Sample 2 had stabilized resulting in the final melt pressures of the samples being similar.

Figure 5:
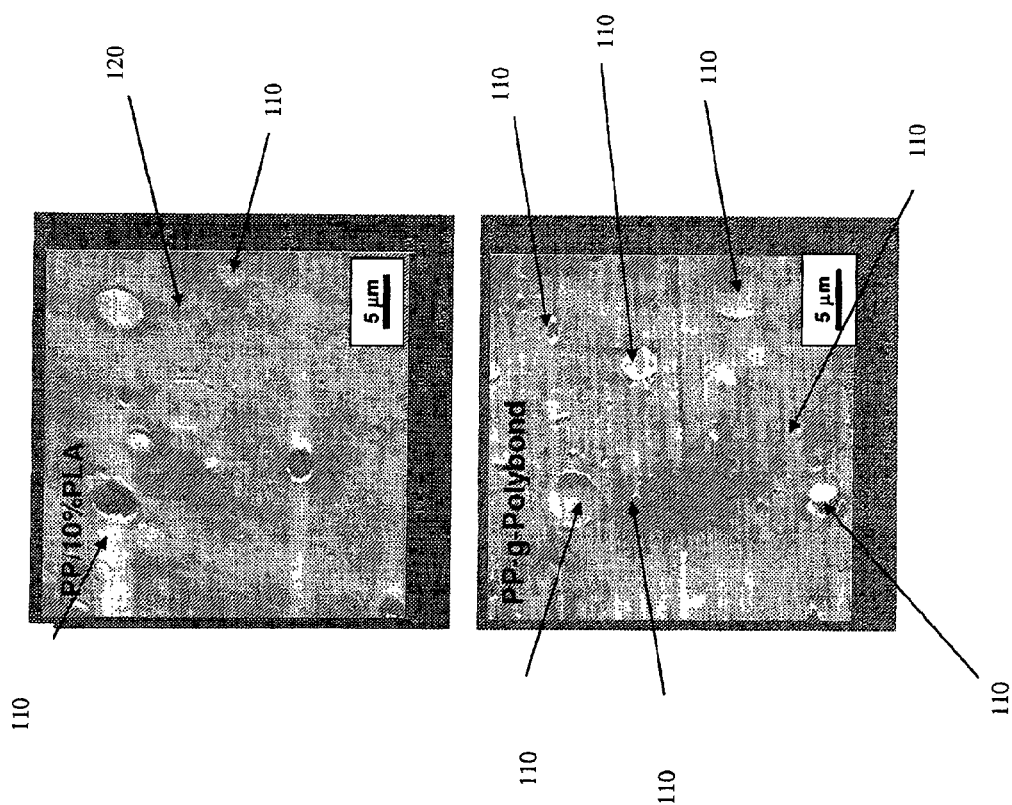
FIG. 5 presents atomic force microscopy pictures for the samples from the Example.

Extruded pellets of both samples were compression molded and subsequently characterized for the extent of phase dispersion of PLA in the PP via Atomic Force Microscopy (AFM). AFM images of both samples are shown in FIG. 5. Referring to FIG. 5, both samples are shown form immiscible blends wherein the PLA, appearing as circular bodies 110, is dispersed in a polypropylene continuous phase, 120. In Sample 1, PLA was seen to form bodies of various sizes within PP with some of the bodies having sizes larger than 5 micrometer (μm). In comparison Sample 2, prepared with a cavitating booster, displays a similar amount of PLA 110 dispersed within the PP. Without wishing to be limited by theory, the cavitating booster, maleated polypropylene, may introduce some polar interactions and H-bonding between PP and PLA phases and may help PLA dispersion to a certain degree.

While embodiments have been shown and described, modifications thereof can be made by one skilled in the art without departing from the spirit and teachings of the disclosure. The embodiments described herein are exemplary only, and are not intended to be limiting. Many variations and modifications of the embodiments disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present disclosure. The discussion of a reference is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein.

The invention claimed is:

1. A pellet comprising:
a polymeric blend comprising a polypropylene matrix comprising a propylene impact copolymer, polylactic acid phases comprising a polylactic acid, rubber phases comprising a rubber, and an epoxy functionalized polyolefin, wherein the epoxy functionalized polyolefin is epoxy functionalized polypropylene or epoxy functionalized polyethylene, wherein the polylactic acid and the epoxy functionalized polyolefin are premixed before being compounded with the propylene impact copolymer, and wherein the polylactic acid phases are encapsulated inside the rubber phases in the polypropylene matrix, and wherein the polymeric blend comprises from 51 to 99.5 weight percent of the propylene impact copolymer and from 0.5 to 49 weight percent of the polylactic acid based on a total weight of the polymeric blend.

2. The pellet of claim 1, wherein the epoxy functionalized polyolefin is epoxy functionalized polyethylene.

3. The pellet of claim 1, wherein the epoxy functionalized polyolefin is epoxy functionalized polypropylene.

4. The pellet of claim 1, wherein the epoxy functionalized polyolefin is PP-g-GMA or PE-co-GMA.

5. The pellet of claim 1, wherein the rubber is ethylene propylene diene rubber (EPDM).

* * * * *